(12) United States Patent
Hanzawa et al.

(10) Patent No.: US 12,352,652 B2
(45) Date of Patent: Jul. 8, 2025

(54) EVALUATION METHOD AND EVALUATION DEVICE FOR MULTI-CORE FIBER

(71) Applicant: NIPPON TELEGRAPH AND TELEPHONE CORPORATION, Tokyo (JP)

(72) Inventors: Nobutomo Hanzawa, Musashino (JP); Takashi Matsui, Musashino (JP); Yuto Sagae, Musashino (JP); Kazuhide Nakajima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 140 days.

(21) Appl. No.: 18/039,600

(22) PCT Filed: Dec. 11, 2020

(86) PCT No.: PCT/JP2020/046406
§ 371 (c)(1),
(2) Date: May 31, 2023

(87) PCT Pub. No.: WO2022/123791
PCT Pub. Date: Jun. 16, 2022

(65) Prior Publication Data
US 2024/0102886 A1    Mar. 28, 2024

(51) Int. Cl.
*G01M 11/00* (2006.01)
*C03C 13/04* (2006.01)

(52) U.S. Cl.
CPC ............. *G01M 11/33* (2013.01); *C03C 13/04* (2013.01); *C03C 2213/00* (2013.01)

(58) Field of Classification Search
CPC .. C03C 13/04; C03C 2213/00; G01M 11/088; G01M 11/33
USPC ........................................................ 356/73.1
See application file for complete search history.

(56) References Cited

U.S. PATENT DOCUMENTS

2017/0160466 A1* 6/2017 Imamura .............. G02B 6/0288
2018/0372954 A1* 12/2018 Matsui ................. G02B 6/4221

OTHER PUBLICATIONS

ITU-T G.652, "Characteristics of a single-mode fibre and cable", 2016.

(Continued)

*Primary Examiner* — Sunghee Y Gray
(74) *Attorney, Agent, or Firm* — Harness, Dickey & Pierce, P.L.C.

(57) ABSTRACT

An object of the present invention is to provide an evaluation method and an evaluation device for easily determining whether or not a structural parameter of a multi-core fiber satisfies a desired connection loss value (a specification). The evaluation method according to the present invention includes a step of measuring center coordinates of each core with the center coordinates when a clad is approximated by a circle as an origin in an observed cross-sectional structure of the multi-core fiber to be objected, obtaining a length of a line segment connecting the origin and the center of each core and an angle formed by two line segments connecting the origin and two adjacent cores, and judging whether or not a desired connection loss characteristic is satisfied on the basis of whether or not the values satisfy a predetermined determination formula.

4 Claims, 11 Drawing Sheets

(56) References Cited

OTHER PUBLICATIONS

ITU-T G. 651.1, "Characteristics of a 50/125μm multimode graded index optical fiber cable for the optical access network", 2018.
ITU-T G.650.1, "Definitions and test methods for linear, deterministic attributes of single-mode fibre and cable", 2018.
JIS-C 6822, "A method for testing the structure parameter of the optical fiber", 2009 with machine generated English translation of Annex A of D4.
T. Matsui et al., "118.5 Tbit/s Transmission over 316 km-Long Multi-Core Fiber with Standard Cladding Diameter", OECC2017, 2-s2892, 2017.
ITU-T L. 12, "Construction, installation and protection of cables and other elements of outside plant", 2008.

\* cited by examiner

EVALUATION METHOD AND EVALUATION DEVICE FOR MULTI-CORE FIBER

CROSS-REFERENCE TO RELATED APPLICATIONS

This application is a 371 U.S. National Phase of International Application No. PCT/JP2020/046406, filed on Dec. 11, 2020. The entire disclosure of the above application is incorporated herein by reference.

TECHNICAL FIELD

The present disclosure relates to an evaluation method and an evaluation device for evaluating a structure of a multi-core fiber.

BACKGROUND ART

In current single-mode fibers or multi-mode fibers, optical characteristics and geometric structural parameters are standardized to ensure interconnection properties (for example, refer to NPLs 1 and 2). The optical fiber disclosed in these is a single core fiber having a core at the center of a clad. A test method for evaluating the deviation amount between a center of clad and a center of core of such an optical fiber is also disclosed (for example, with refer to NPLs 3 and 4).

CITATION LIST

Non Patent Literature

[NPL 1] ITU-T G. 652, "Characteristics of a single-mode fibre and cable", 2016
[NPL 2] ITU-T G. 651.1, "Characteristics of a 50/125 µm multimode graded index optical fiber cable for the optical access network", 2018
[NPL 3] ITU-T G. 650.1, "Definitions and test methods for linear, deterministic attributes of single-mode fibre and cable", 2018
[NPL 4] JIS-C 6822, "A method for testing the structure parameter of the optical fiber", 2009
[NPL 5] T. Matsui et. al., "118.5 Tbit/s Transmission over 316 km-Long Multi-Core Fiber with Standard Cladding Diameter", OECC2017, 2-s2892, 2017
[NPL 6] ITU-T L.12, "Construction, installation and protection of cables and other elements of outside plant", 2008

SUMMARY OF INVENTION

Technical Problem

The optical characteristics of the multi-core optical fiber (MCF) having a plurality of cores in the clad can be evaluated for each core by the method shown in NPL 3. On the other hand, the methods shown in NPLs 3 and 4 are on the assumption that one core is arranged with respect to the clad and the core is arranged at the center of the clad, and the structural parameters are limited to the evaluation of the deviation amount between the center of the clad and the center of the core. Therefore, the methods disclosed in NPLs 3 and 4 cannot be applied to MCF as disclosed in NPL 5. For this reason, in order to realize interconnection of MCF having no core at the center of the clad, a method of evaluating the structural parameters of MCF is required.

The optical fiber has a tolerance in a clad diameter. For example, consider a 4-core fiber in which four cores are formed at a space of 40 µm between adjacent cores on a clad having a diameter of 125 µm. Even if the arrangement of the cores is ideal, the core space measured for each cross-section changes in a similar shape from 40 µm in accordance with the change in the clad diameter. Therefore, when the MCF is connected, it is necessary to calculate the core space on the basis of the center coordinates of each core calculated from the design value of the fiber, change the center coordinates of the core in the similar shape in accordance with the clad diameter, and determine whether or not the connection loss satisfies a desired value (a specification).

Then, an object of the present invention is to provide an evaluation method and evaluation device for easily judging whether or not a structural parameter of an MCF satisfies a desired connection loss value (a specification).

Solution to Problem

In order to achieve the above object, in an evaluation method according to the present invention, it is judged whether or not center coordinates of cores are within a predetermined region obtained from a desired connection loss in a cross section of the MCF.

Specifically, a first evaluation method according to the present invention is an evaluation method of a multi-core fiber in which N-pieces of cores (N is an integer of 3 or more) are arranged in an N-angular shape at a space Λ in a cross section, including:

performing a cross-sectional observation of the multi-core fiber with a camera;

approximating a clad of the multi-core fiber with a circle when the cross-sectional observation is performed;

measuring center coordinates of each of the cores in the clad with center coordinate of the circle as an origin; and judging that a desired connection loss characteristic is obtained, when a length $R_i$ of each line segment connecting the origin and the center coordinate of the core (i is a number of the core and is a natural number equal to or less than N) satisfies a range of $r_s - r_d \leq R_i \leq r_s + r_d$ and an angle $\theta_{i\text{-}j}$ formed by line segments of the adjacent cores (j is the number of the core adjacent to the core of number i, and is a natural number equal to or less than N) satisfies a range of $\theta_s - \theta_d \leq \theta_{i\text{-}j} \leq \theta_s + \theta_d$.

where

[Math. 1]
$$\theta s[deg] = \frac{360}{N}, \quad (1)$$

[Math. 2]
$$r_s = \frac{\Lambda}{2\cos\left(90 - \frac{\theta s}{2}\right)}, \quad (2)$$

[Math. 3]
$$\eta = \left\{\frac{2W_1 W_2}{W_1^2 + W_2^2}\right\}^2 \exp\left[-\frac{2d^2}{W_1^2 + W_2^2}\right], \quad (3)$$

[Math. 4]

$$r_d = \sqrt{-\frac{w_i^2 + w_j^2}{2} \ln\left[\frac{\eta}{\left\{\frac{2w_iw_j}{w_i^2+w_j^2}\right\}^2}\right]}, \quad (4)$$

[Math. 5]

$$\theta_d = 2 * \tan^{-1}\left(\frac{r_d}{r_s}\right), \quad (5)$$

$W_i$ is a mode field diameter (MFD) of the core of number i at a desired wavelength.

In addition, a second evaluation method according to the present invention is an evaluation method of a multi-core fiber in which N-pieces of cores (N is an integer of 3 or more) are arranged in an N-angular shape at a space Λ in a cross section, including:

performing a cross-sectional observation of the multi-core fiber with a camera;

approximating a clad of the multi-core fiber with a circle when the cross-sectional observation is performed;

measuring center coordinates of each of the cores in the clad with center coordinate of the circle as an origin; and judging that a desired connection loss characteristic is obtained, when a deviation amount $\delta\Lambda_x$ between a design center coordinate which is a design center coordinate of the core calculated by Math. 6 and the measured center coordinate satisfies $\delta\Lambda_x \leq r_d$.

[Math. 6]

$$\delta\Lambda_x = \sqrt{2r_s\{r_s + r - (r_s + r)\cos\theta\} + r^2} \quad (6)$$

where, $r = R_i - r_s$, $\theta = \theta_{i\text{-}j} - \theta_s$ $R_i$ represents a length of each line segment connecting the origin and the center coordinate of the core (i is a number of the core, and is a natural number equal to or less than N), $\theta_{i\text{-}j}$ represents an angle formed by the line segments of the adjacent cores (j is the number of the core adjacent to the core of number i, and is a natural number equal to or less than N).

Furthermore, an evaluation device according to the present invention includes a camera configured to perform cross-sectional observation of the multi-core fiber, and a processor configured to perform the evaluation method of the multi-core fiber, and the evaluation device determines whether or not the multi-core fiber has a desired connection loss characteristic.

In the evaluation method of the MCF according to the present invention, the outer diameter of the clad is approximated by a circle, and it is judged whether or not the center coordinates of each of a plurality of cores in the clad are within the desired range from the coordinates of the designed core space with the center coordinates of the clad as the origin. Therefore, it can be easily determined whether or not a loss of connecting MCFs each other can be suppressed under the desired connection loss from the cross section of the MCF.

Therefore, the present invention can provide the evaluation method and the evaluation device for easily judging whether or not the structural parameter of the MCF satisfies the desired connection loss value (the specification).

The above inventions can be combined as much as possible.

Advantageous Effects of Invention

The present invention can provide an evaluation method and an evaluation device for easily judging whether or not a structure parameter of an MCF satisfies a desired connection loss value (a specification).

DESCRIPTION OF EMBODIMENTS

Embodiments of the present invention will be described with reference to the accompanying drawings. The embodiments described below are examples of the present invention and the present invention is not limited to the following embodiments. Note that constituent elements with the same reference signs in the present description and the drawings are identical to each other.

Before describing each embodiment, a structure of a MCF will be described. In the MCF having N pieces of cores at the core space Λ, an angle θs [degree], which is made by the two cores adjacent to a center of a clad, is determined by the equation (1).

[Math. 1]

$$\theta s[deg] = \frac{360}{N},  \quad (1)$$

In addition, a distance rs from the center of the clad to the center of the core of the outer peripheral core is determined by the equation (2).

[Math. 2]

$$r_s = \frac{\Lambda}{2\cos\left(90 - \frac{\theta s}{2}\right)},  \quad (2)$$

Figure 1:
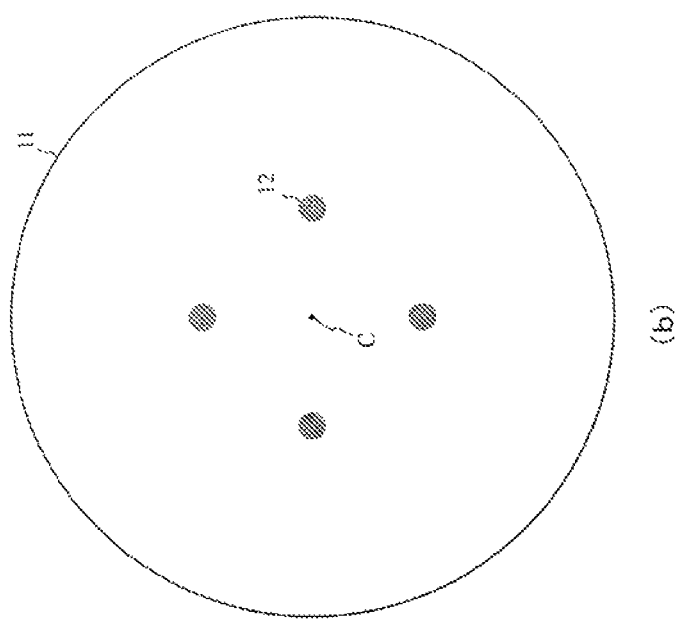
FIG. 1 is a diagram for explaining a cross section of an optical fiber. (a) denotes a single core fiber, and (b) denotes a multi-core fiber.
Figure 1:
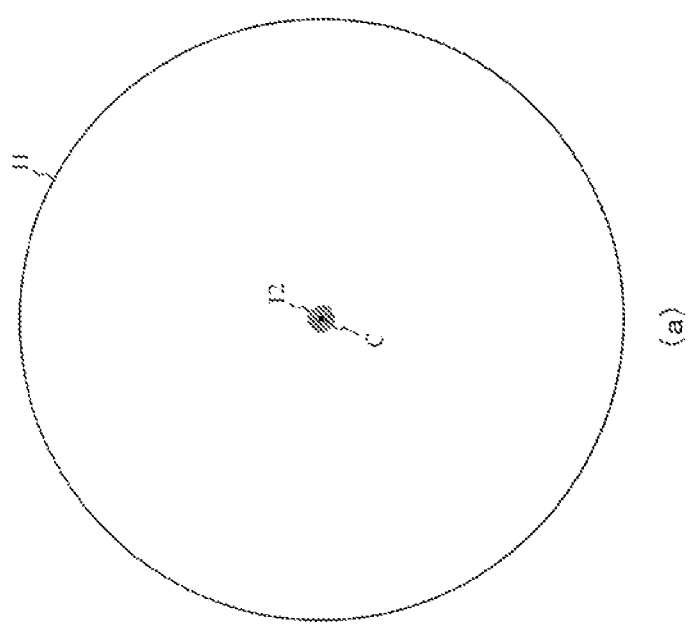

FIG. 1 (a) is a cross-sectional view of a single-core fiber (SCF) currently used. As shown in FIG. 1 (a), the SCF has a structure in which only one core 12 exists in the clad 11 and the core 12 is arranged at the center C of the clad 11. On the other hand, in an MCF, as shown in FIG. 1 (b), a plurality of cores 12 are arranged in the clad 11. Although the core 12 may be arranged at the center C of the clad 11, the MCF in which the core 12 is not arranged at the center C will be described in the present embodiment. In addition, it is assumed that optical characteristics of the core in the MCF conform to G. 652. D described in NPL 1.

Figure 2:
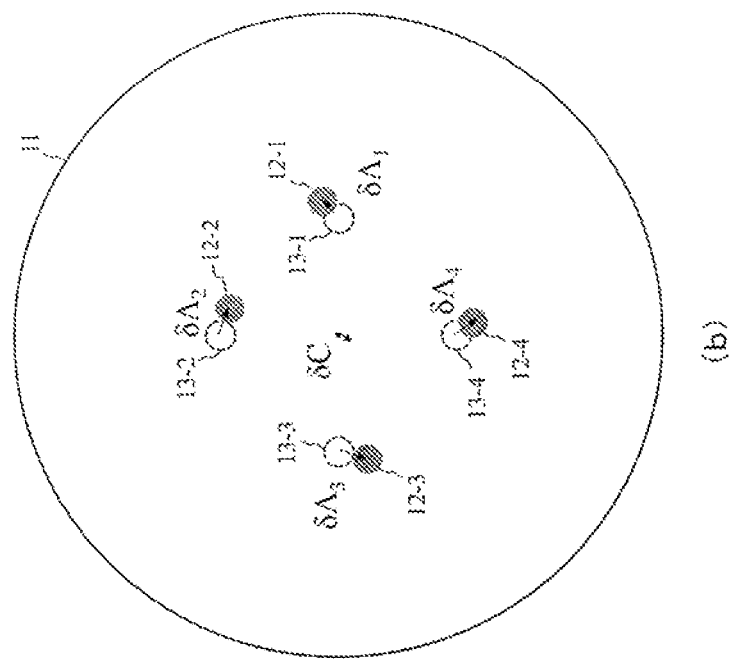
FIG. 2 is a diagram for explaining a cross section of an optical fiber. (a) explains a core arrangement of a 4-core fiber, and (b) explains a core position deviation δΛx.
Figure 2:
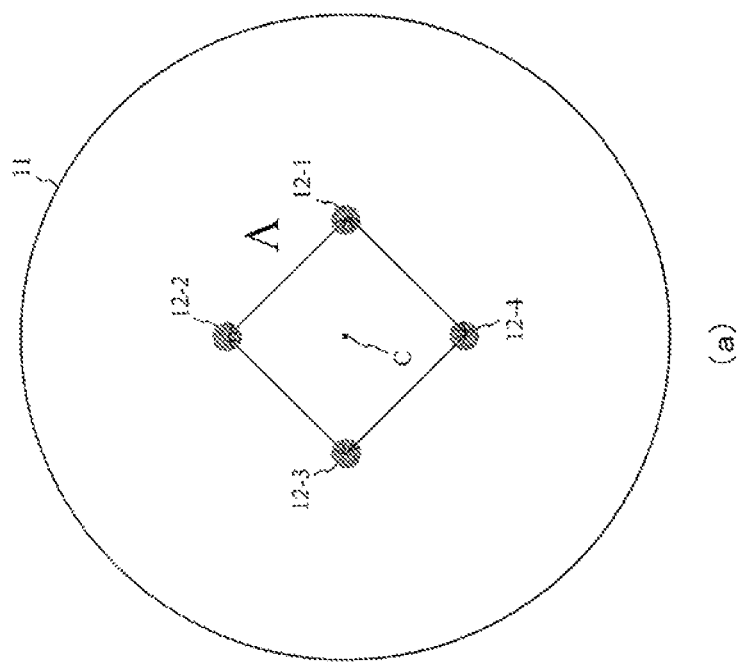

FIG. 2 (a) is a diagram for explaining a 4CF (a 4 Core Fiber) in which four cores (12-1 to 12-4) are arranged at a space A in the clad 11. In order to connect the 4CFs with a low connection loss, it is necessary that the four cores (12-1 to 12-4) are arranged at roughly matching positions between 4CFs. However, as shown in FIG. 2 (b), the position of each core (12-1 to 12-4) will have a positional deviation amount δΛx (x is any one of 1 to 4) for a design position (13-1 to 13-4) due to a production variation or the like.

Here, connection loss generated from the positional deviation amount of the core in 4CF designed with the core space Λ as 40 μm is calculated. In the calculation of the connection loss, the coupling efficiency η with respect to an axial deviation amount d (μm) is calculated by using the equation (3) and loss is calculated.

In addition, a positional deviation amount is defined as δΛ$_x$ (μm) in each core, a maximum positional deviation amount δmax from the design core position is set, and a value within δmax is given at random.

[Math. 3]

$$\eta = \left\{ \frac{2W_1 W_2}{W_1^2 + W_2^2} \right\}^2 \exp\left[ -\frac{2d^2}{W_1^2 + W_2^2} \right],  \quad (3)$$

Where, $W_1$ and $W_2$ are the mode field radii of the respective 4CF to be connected. That is, when the 4CF to be connected is an optical fiber 1 and an optical fiber 2, the mode field radius of each of the cores (12-1 to 12-4) of the optical fiber 1 is $W_1$, and the mode field radius of each of the cores (12-1 to 12-4) of the optical fiber 2 is $W_2$.

Figure 3:
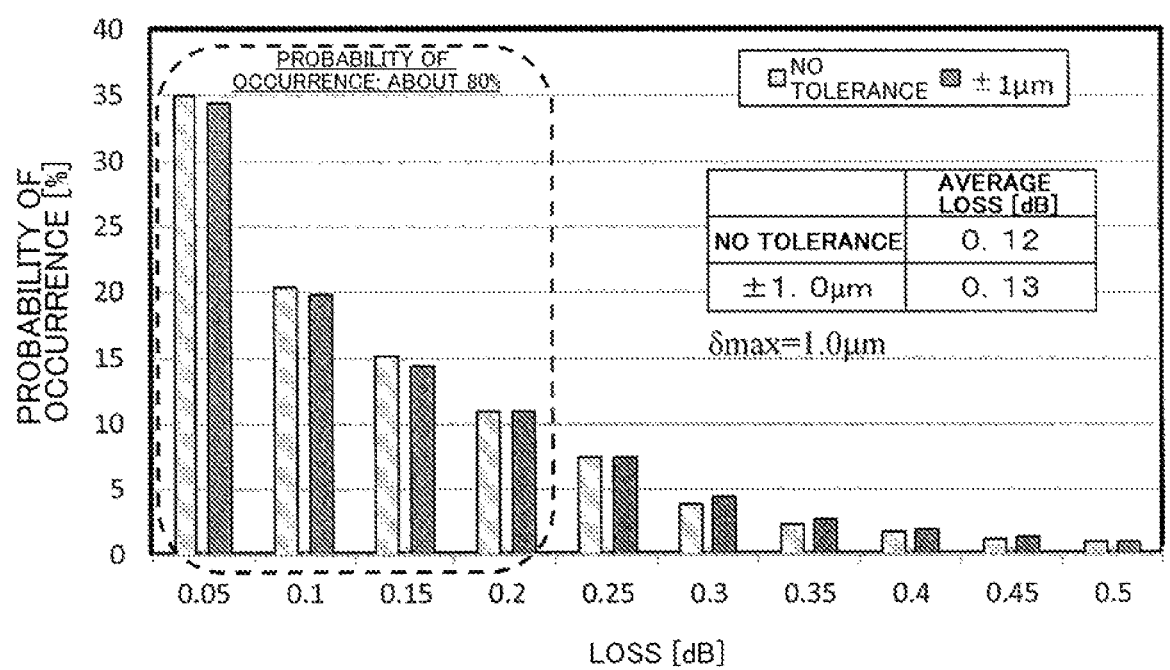
FIG. 3 is a diagram for explaining a distribution of a connection loss (a connection loss characteristic) of the 4-core fiber.

FIG. 3 is a diagram for explaining the calculated connection loss distribution (the connection loss characteristic). The parameters used in the calculations are as follows. In the case where both the clad diameters of the optical fibers are 125 μm (the case where there is no tolerance) and the case where the clad diameter of one optical fiber is 125 μm and the other optical fiber is 125 μm±1.0 μm (the case where the clad diameter is different), the calculation was performed with a random positional deviation of 10,000 times on the assumption that δmax is 1.0 μm. The connection loss characteristic is shown by the probability (%) of occurrence of the connection loss (the maximum loss) (dB) by the magnitude shown in the horizontal axis.

In the case where there is no tolerance, the connection loss characteristic is a loss characteristic corresponding to the difference of the positional deviation δΛ$_x$ of each core. In the case where the clad diameters are different, the connection loss characteristic is a loss characteristic that includes a random deviation of the clad diameter in addition to the difference of the positional deviation δΛ$_x$ of each core.

Here, in a fusion connection of the standard SMF conforming to NPL 1, the standards in which the probability of the occurrence in which an average loss is equal to less than 0.1 dB and the maximum loss is equal to or less than 0.2 dB or less is 97% are described in NPL 6. As shown in FIG. 3, in both cases where there is no tolerance and where the clad diameters are different, neither the average loss nor the maximum loss does not satisfy the above-mentioned standards.

Figure 4:
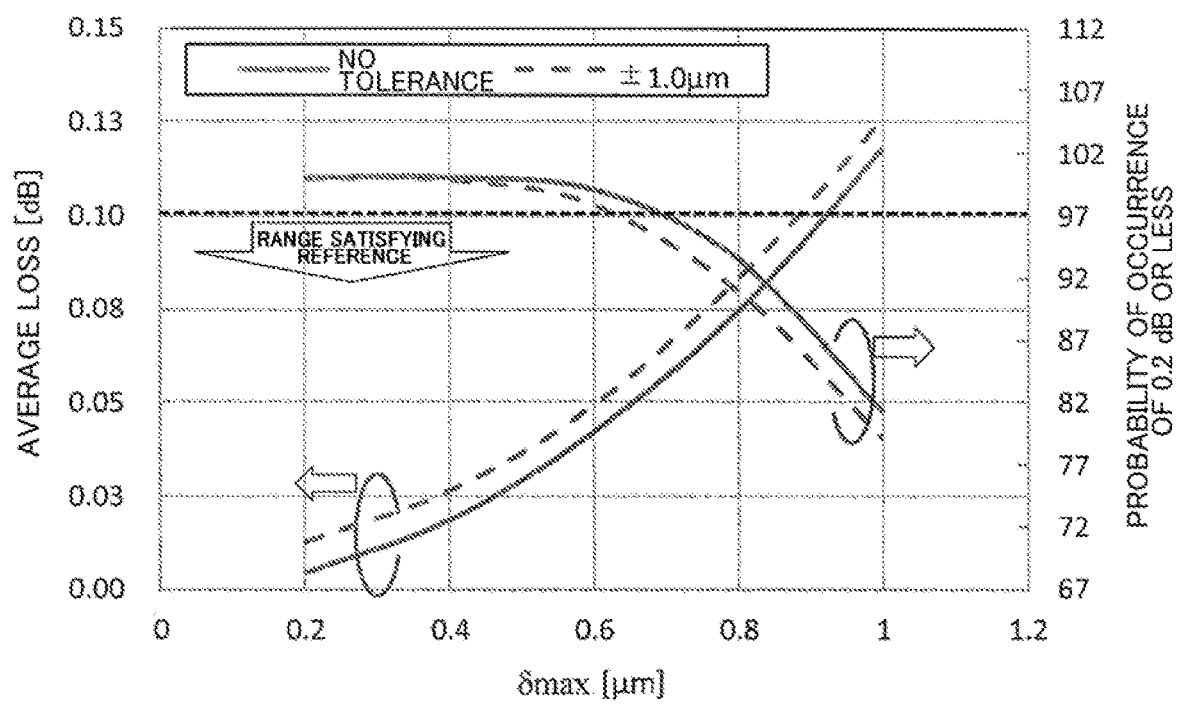
FIG. 4 is a result for calculating an average loss and probability of an occurrence of 0.2 dB or less for a maximum loss to a deviation of the core in the 4-core fiber.

FIG. 4 is a diagram for explaining the calculation result of the probability of the occurrence of the average loss and the maximum loss of 0.2 dB or less for δmax. The horizontal axis represents δmax (μm), the first vertical axis represents the probability of the occurrence of the average loss (dB), and the second vertical axis represents the probability (%) of the occurrence of the maximum loss of 0.2 dB or less. The solid line indicates the result of the case where there is no tolerance, and the broken line indicates the result of the case where the clad diameters are different. As shown in FIG. 4, it is confirmed that in the case where there is no tolerance, δmax is equal to or less than 0.7 μm, therefore, the standards of both the average loss and the maximum loss are satisfied, and in the case where the clad diameters are different (the difference amount is 1.0 μm), δmax is equal to or less than 0.65 μm, therefore, the standards of both the average loss and the maximum loss are satisfied.

From the above, it can be seen that it is effective to evaluate the deviation from the center coordinates of each core in order to connect the MCFs to each other in accordance with the loss standard as shown in NPL 6.

Embodiment 1

Figure 5:
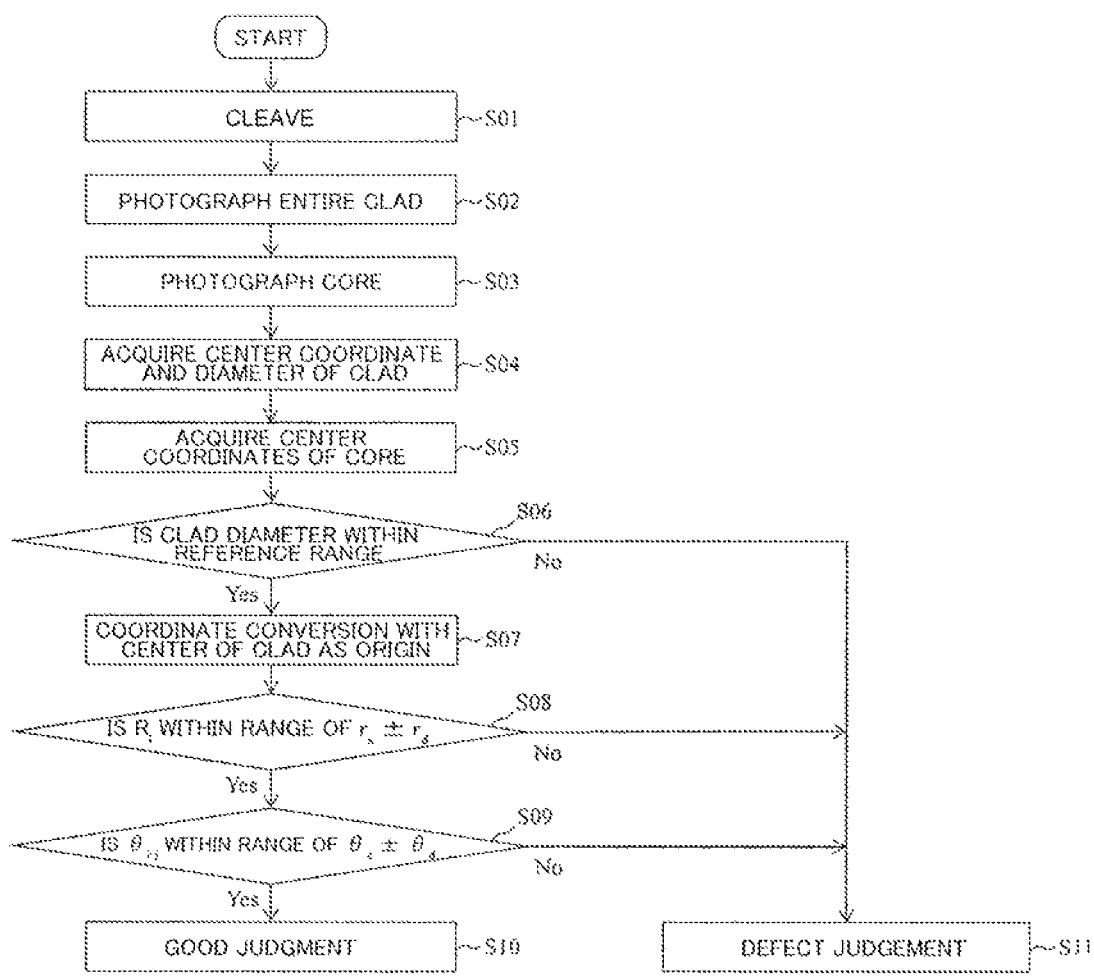
FIG. 5 is a flowchart for explaining an evaluation method of the multi-core fiber according to the present invention.

FIG. 5 is a flowchart for explaining the evaluation method of the MCF of the present embodiment. The present evaluation method is an evaluation method of the multi-core fiber in which N pieces of cores (N is an integer of 3 or more) are arranged in an N-angular shape at a space Λ in a cross section, the evaluation method is characterized in that a cross-sectional observation of the multi-core fiber with a camera is performed (step S01 to S03), a clad of the multi-core fiber is approximated with a circle when the cross-sectional observation is performed (step S04), center coordinates of each of the cores in the clad with the center coordinates of the circle as an origin are measured (step S05), and when a length $R_i$ of each line segment connecting the origin and the center coordinate of the core (i is a number of the core and is a natural number equal to or less than N) satisfies a range of $r_s - r_d \leq R_i \leq r_s + r_d$ and an angle $\theta_{i\text{-}j}$ formed by line segments of the adjacent cores (j is the number of the core adjacent to the core of number i, and is a natural number equal to or less than N) satisfies a range of $\theta_s-\theta_d \leq \theta_{i-j} \leq \theta_s+\theta_d$, it is judged that a desired connection loss characteristic is obtained (step S06 to S11).

The method of the present embodiment is a method for judging whether or not the core space is a core space capable of realizing a reference connection loss characteristic regardless of a change in the clad diameter.

The method first performs a step of measuring structural parameters of the MCF. The MCF is cut by a fiber cutter or the like, and the cross section is polished to form a horizontal surface (a vertical surface to a longitudinal direction) (step S01). Subsequently, an image of the entire horizontal surface (an image of the clad) is acquired by a camera (step S02), and the image in the clad is acquired (step S03). Next, the outer periphery of the clad is approximated by a circle from the image of the clad, and the center coordinate and the clad diameter are calculated (step S04). Also, each core is approximated by a circle, and each center coordinate is calculated (step S05). Note that the center of the clad and the center position of each core can be obtained by a measuring method as shown in, for example, NPLs 3 and 4. The measurement steps are terminated in a step S05.

The present method subsequently performs a step of judging whether or not the measured structural parameter of the MCF is within a reference. First, it is judged whether or not the clad diameter is within a reference (step S06). When the clad diameter is a reference outside (step S06; No), it is judged to be a defect (step S11). When the clad diameter is within a reference (step S06; Yes), the center coordinate of the clad is set to an origin (0, 0), and the center coordinates of each measured core on the end surface are converted to the coordinated in which the center of the clad is origin (step S07). The reason for performing this step is as follows. Since the end surface image of the MCF acquired in the step S02 may have either the center of the entire image or the four corners of the image as an origin, the coordinate position of each core is shifted so as to have the center of the clad as the origin for the judgement step.

Figure 6:
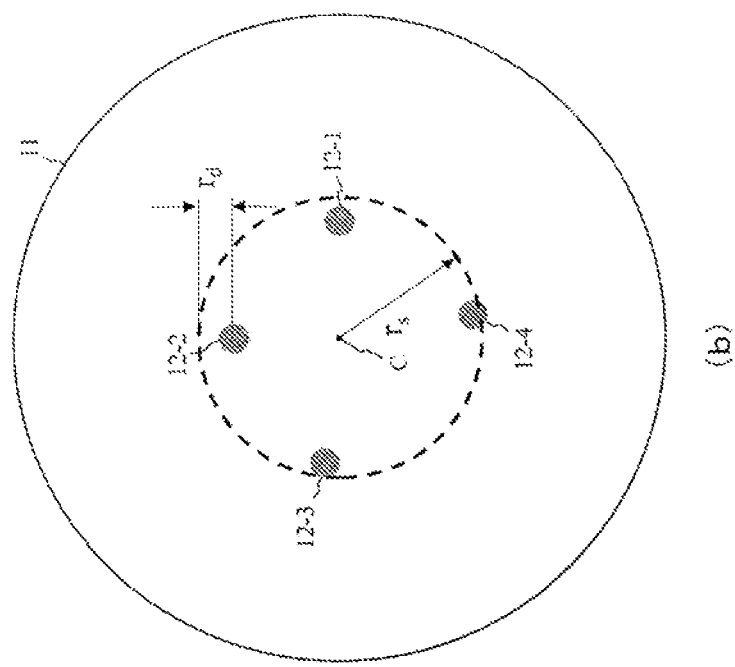
FIG. 6 is a diagram for explaining a cross section of an optical fiber. (a) explains a positional deviation of the core in a circumferential direction, and (b) explains the positional deviation of the core in a radial direction.
Figure 6:
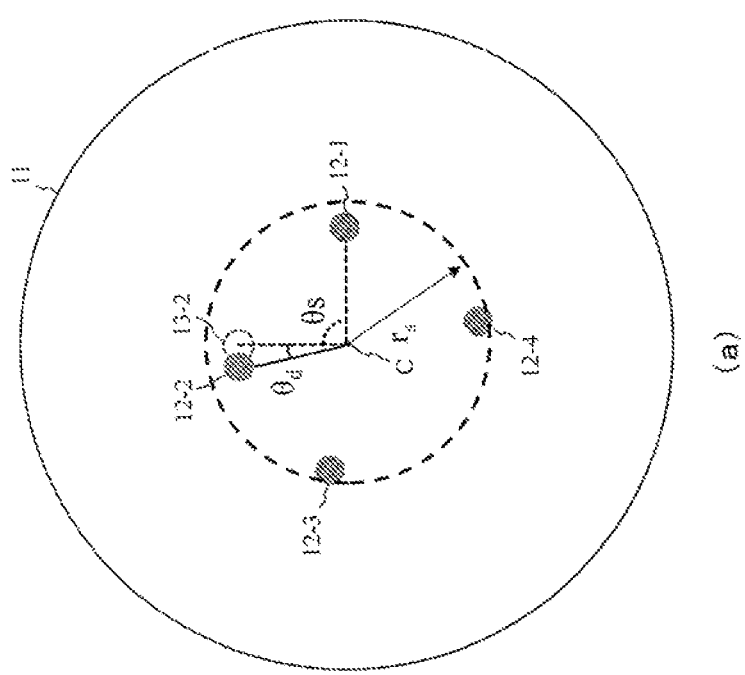

Next, with respect to the length $r_s$(μm) of the line segment from the design center of the clad to the center of each core, it is judged whether or not the length $R_i$ (μm) of the line segment from the acquired center of the clad from the image to the center of each core is within a predetermined range $r_d$ (μm) (step s08, refer to FIG. 6 (b) for $r_s$ and $r_d$). When the length $R_i$ is the outside of the range (step S08; No), it is judged to be the defect (step S11).

When the length $R_i$ is within the range (step S08; Yes), the next judgement is performed (step S09). A line segment connecting the core i and the origin is defined as a first line segment, and a line segment connecting the core j adjacent to the core i and the origin is defined as a second line segment. An angle formed by the first line segment and the second line segment acquired from the image is defined as $\theta_{i-j}$ [degree]. With respect to a design angle $\theta_s$ [degree] formed by the first line segment and the second line segment, it is judged whether or not the angle $\theta_{i-j}$ satisfies within a predetermined $\theta_d$ [degree] (refer to step S09 and FIG. 6 (a) for $\theta_s$ and $\theta_d$). When the angle $\theta_{i-j}$ is within the range (step S09; Yes), it is judged to a good structure and the step is terminated (step S10). On the other hand, when the angle $\theta_{i-j}$ is out of the range (step S09; No) and it is judged to be the defect (step S11).

The judgement steps are terminated in the step S10 or S11.

The tolerance $r_d$ and the tolerance of the angle $\theta_d$ used in the steps S08 and S09 are determined by the equations (4) and (5).

[Math. 4]

$$r_d = \sqrt{-\frac{w_i^2+w_j^2}{2}\ln\left[\frac{\eta}{\left\{\left(\frac{2w_iw_j}{w_i^2+w_j^2}\right)^2\right\}}\right]}, \quad (4)$$

[Math. 5]

$$\theta_d = 2*\tan^{-1}\left(\frac{r_d}{r_s}\right), \quad (5)$$

$W_i$ is the mode field diameter (MFD) of the core of number i at a desired wavelength. η is the same as the coupling efficiency described in the equation (3), and a desired connection loss value (a linear value) is substituted.

Figure 7:
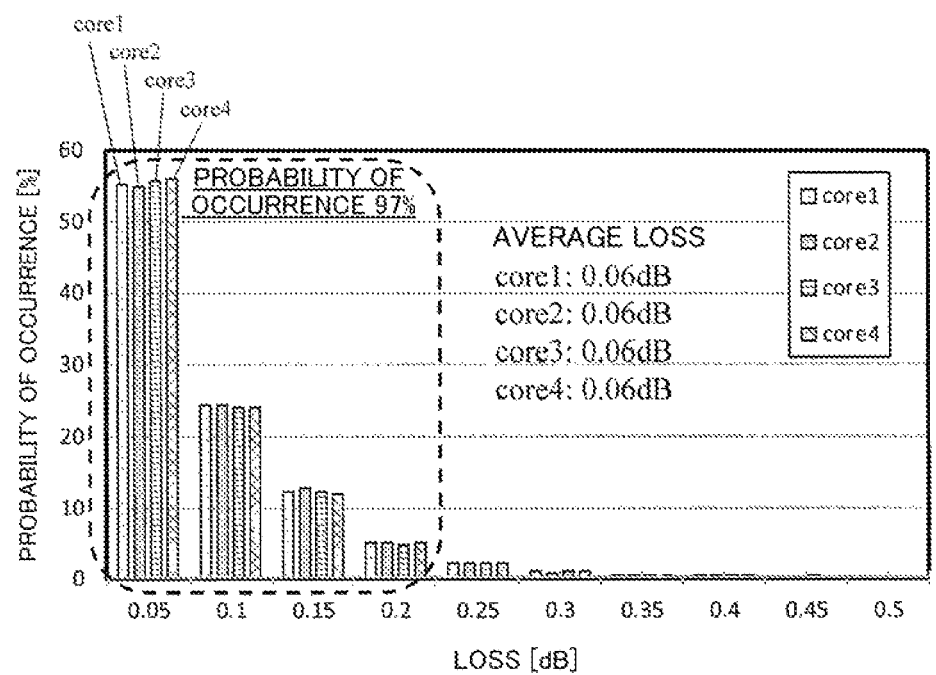
FIG. 7 is a diagram for explaining a distribution of a connection loss (a connection loss characteristic) of the 4-core fiber.

FIG. 7 is a diagram for explaining a distribution (a connection loss characteristic) of the connection loss when MCFs selected as good by the above-mentioned evaluation method are connected to each other.

The present connection loss characteristic is for a 4-core fiber having an MCF of Λ=40 μm, and the MFD of each core is set to $W_1=W_2$=8.6 μm, $r_s$=28.3 μm, $\theta_s$=90 degrees, $r_d$=0.6 μm, and $\theta_d$=2.0 degree, and δmax=0.8 μm, this is the result of calculation under the condition that the random positional deviations of 10,000 times are given to the core. The horizontal axis and the vertical axis have the same meanings as those in FIG. 3.

From the result of FIG. 7, it can be seen that the loss standard shown in NPL 6 is satisfied by selecting the MCF using the judgement flow of FIG. 5. In other words, the MCF satisfying good connection characteristic can be selected by using the judgement method of the present invention. Note that although an example in which the end surface structure is judged so as to satisfy the connection loss conditions described in NPLs 3 and 4 is shown, other connection loss conditions can also be judged by the same procedure by obtaining the necessary core eccentricity amount as shown in FIG. 4.

Embodiment 2

Figure 8:
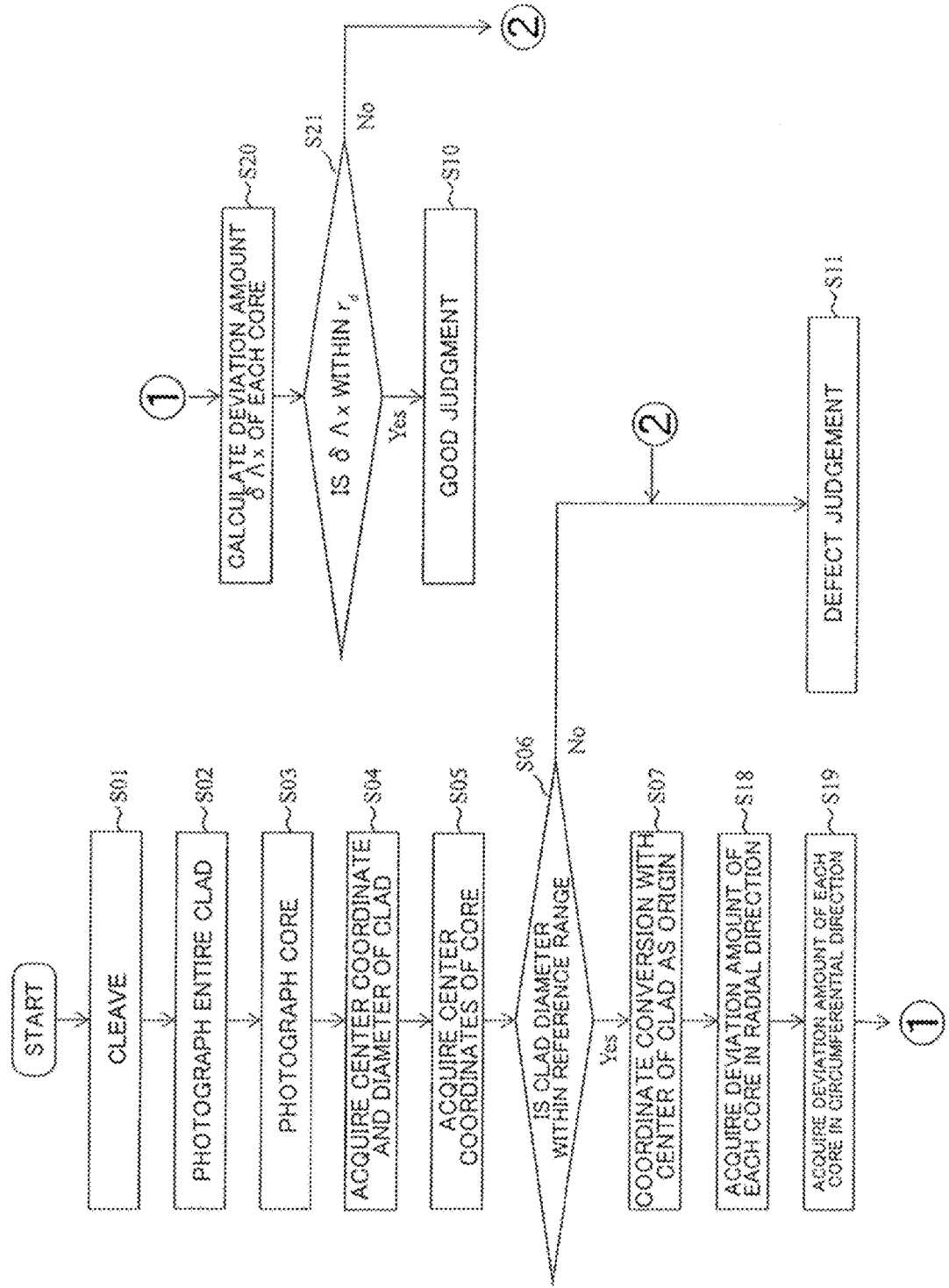
FIG. 8 is a flowchart for explaining an evaluation method of the multi-core fiber according to the present invention.

FIG. 8 is a flowchart for explaining the evaluation method of the MCF of the present embodiment. The present evaluation method is the same as the procedure described in FIG. 5 up to the step S07. In this embodiment, only parts that differ from the embodiment 1 will be described.

This evaluation method is characterized in that, after the step S07, when a deviation amount $\delta\Lambda_x$ between a design center coordinate which is the design center coordinate of the core calculated by Math. 6 and the measured center coordinate satisfies $\delta\Lambda_x \leq r_d$, it is determined that a desired connection loss characteristic is obtained (steps S18 to S21, S10, S11).

The method of the present embodiment is a method for judging whether or not the MCF satisfies a desired connection loss characteristic by judging whether or not the measured center position of the core is within an allowable position deviation amount for the design center position of the core.

Figure 9:
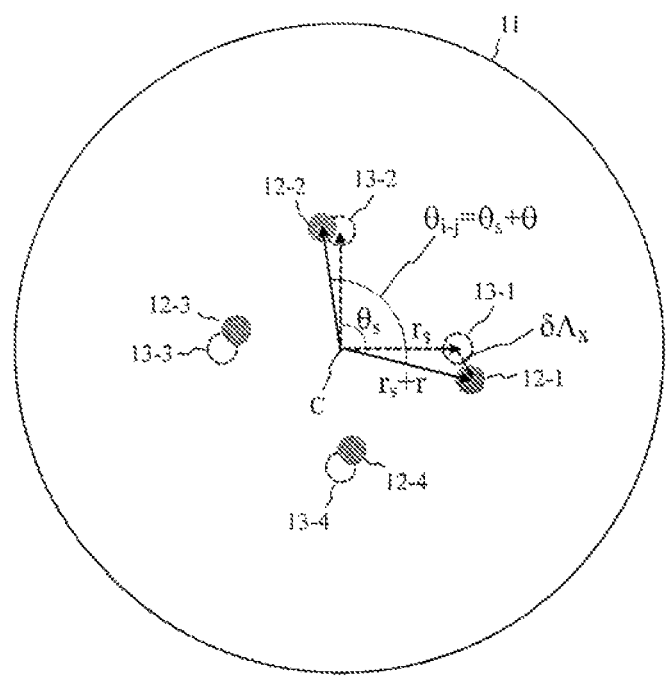
FIG. 9 is a diagram for explaining a deviation of the core position δΛx in the cross section of the optical fiber.

FIG. 9 is a diagram for explaining the deviation amount $\delta\Lambda_x$ between the design center position of the core and the measured center position of the core of the MCF. The deviation amount $\delta\Lambda_x$ can be expressed by the following equation.

[Math. 6]

$$\delta\Lambda_x = \sqrt{2r_s\{r_s + r - (r_s + r)\cos\theta\} + r^2} \quad (6)$$

where, $r = R_i - r_s$, $\theta = \theta_{i-j} - \theta_s$ is satisfied, each represents the deviation amount for the design position of the measurement result for the radial direction and the circumferential direction.

In the judgement step of the present method, first, the length $r_s$ (μm) of the line segment between the design center of the clad and the center of each core is subtracted from the length $R_i$ (μm) of the line segment between the center of the clad and the center of each core acquired from the image, the deviation amount r in the radial direction is calculated for each core (step S18). Subsequently, the design angle $\theta_s$ [degree] formed by the first line segment and the second line segment is subtracted from $\theta_{i-j}$ [degree] formed by the first line segment and the second line segment acquired from the image, the deviation amount $\theta$ [degree] of the circumferential direction is calculated for each core (step S19). Further, the deviation amount $\delta\Lambda_x$ is calculated for each core (step S20) by the equation (6).

Subsequently, it is judged whether or not the deviation $\delta\Lambda_x$ is within the $r_d$ (refer to the equation (4)) obtained from the allowable loss (step S21). When the deviation $\delta\Lambda_x$ is within the $r_d$ (step S21; Yes), it is judged that the structure is good and terminates the step (step S10). On the other hand, when the deviation amount $\delta\Lambda_x$ is larger than the $r_d$ (step S21; No), it is judged to be the defect (step S11).

The judgement steps are terminated in the step S10 or S11.

In the evaluation method of the present embodiment, two deviation amounts in the radial direction and the circumferential direction can be judged at the same time, and the evaluation method is preferable.

Embodiment 3

Figure 10:
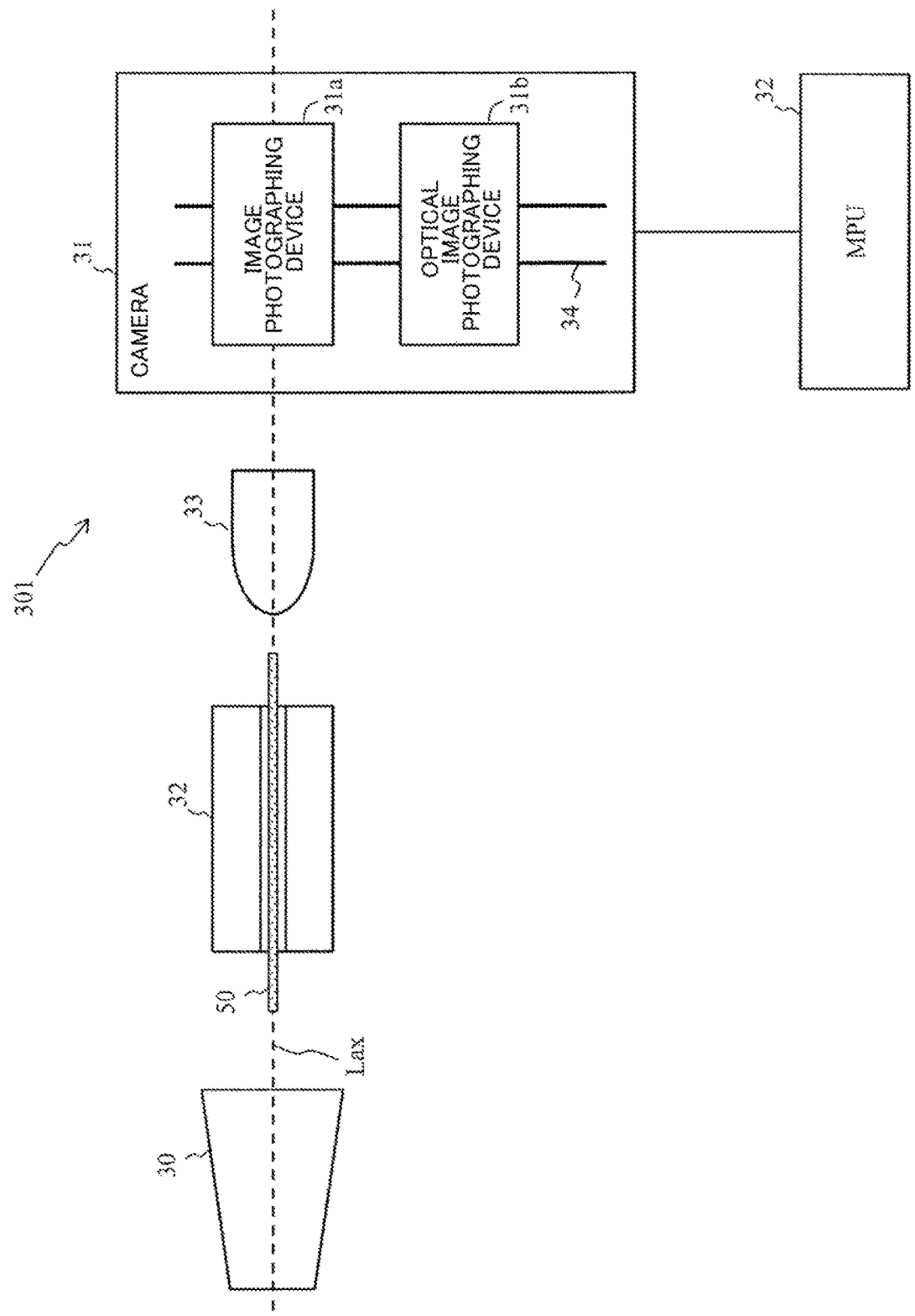
FIG. 10 is a diagram for explaining an evaluation device of the multi-core fiber according to the present invention.

FIG. 10 is a diagram for explaining an evaluation device 301 of the present embodiment. The evaluation device 301 includes a camera 31 for observing the cross section of the multi-core fiber 50, and a processor 32 for performing the evaluation method described in embodiment 1 or 2, and judges whether or not the multi-core fiber 50 has the desired connection loss characteristic.

Figure 11:
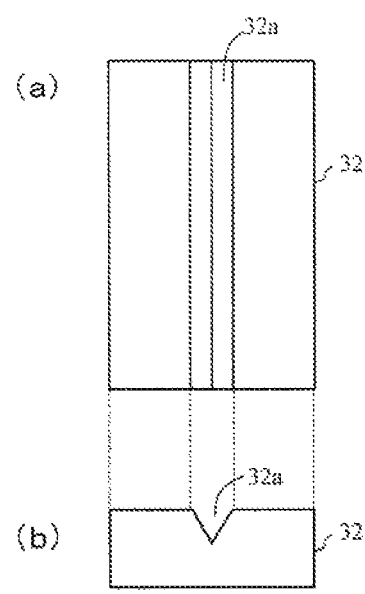
FIG. 11 is a diagram for explaining an optical fiber holding part of the evaluation device of the multi-core fiber according to the present invention. (a) denotes a top view, and (b) denotes a side view.

The evaluation device 301 will be described with reference to FIG. 10. The evaluation device 301 further includes a light source 30, an optical fiber holding part 32, and an objective lens 33. The camera 31 includes an image photographing device 31a, an optical image photographing device 31b, and a switching part 34 for moving these photographing devices with respect to an optical axis Lax. The light source 30 is a white light source such as a halogen lamp, and the light may be condensed by a lens or the like as long as the whole clad of the MCF 50 can be irradiated. The optical fiber holding part 32 horizontally installs the MCF 50 and suppresses the MCF 50 so as not to move. For example, the optical fiber holding part 32 has a V-groove 32a as shown in FIG. 11 and a clamp (not shown) for suppressing the MCF 50 from above so that the MCF 50 is horizontally installed in the V-groove 32a and does not move.

The objective lens 33 has a magnification in which the whole clad of the MCF 50 is photographed or is configured to photograph the whole clad of the MCF 50 by simultaneously moving the image photographing device 31a or the optical image photographing device 31b by the switching part 34 even when the magnification is such that only one part is photographed.

The image photographing device 31a and the optical image photographing device 31b can photograph a range sufficiently satisfying the visual field of the objective lens 33. The image photographing device 31a can photograph the whole end surface of the MCF 50. The optical image photographing device 31b can photograph the intensity distribution of the near infrared light emitted from the core part of the MCF 50.

The image photographing device 31a and the optical image photographing device 31b are movable by the switching device 34, each can be linearly arranged so that an optical axis is aligned with the light source 31, the MCF 50 and the objective lens 33. The switching device 34 is, for example, a rail or a revolver. That is, by switching the image photographing device 31a and the optical image photographing device 31b by the switching device 34, the two kinds of end surface images (the image of the whole end surface of the MCF 50 and the image of the intensity distribution of the near infrared light emitted from the core part) can be photographed. The camera 31 and the processor 32 are connected, and two kinds of end surface images acquired by the camera 31 are sent to the processor 32.

The processor 32 synthesizes the two kinds of end surface images to measure the clad diameter of the optical fiber and the center coordinates of each core, and performs the evaluation based on the judgement flow shown in FIG. 5 or FIG. 8. Therefore, the evaluation device 301 can easily judge whether or not the MCF 50 to be inspected has the desired connection loss characteristic.

Note that the operation of processor 32 is realized by a computer and a program, and the program can be recorded in a recording medium or provided through a network.

OTHER EMBODIMENTS

In the above embodiments, although the above embodiments are described with reference to 4CF, the number of cores of the MCF that can be evaluated is not limited to 4. The MCF having the cores of 3 or more can be evaluated. In addition, in the above embodiment, although the MCF having no core at the center of the optical fiber is described, the MCF having core at the center of the optical fiber can be also evaluated. Further, the MCF in which the cores are not polygonal but annularly arranged can be evaluated.

The MCF in which the cores are arranged in a hexagonal close-packed state can also be evaluated by utilizing the core in the outermost periphery.

REFERENCE SIGNS LIST

11 Clad
12, 12-1, 12-2, 12-3, 12-4 Core
13, 13-1, 13-2, 13-3, 13-4 Design core position
30 Light source
31 Camera
31a Image photographing device
31b Optical image photographing device 32 Optical fiber holding part
32a V-groove
33 Objective lens
34 Switching device
35 Processor
50 Multi-core fiber
301 Evaluation device

The invention claimed is:

1. An evaluation method of a multi-core fiber in which N-pieces of cores (N is an integer of 3 or more) are arranged in an N-angular shape at a distance $\Lambda$ in a cross section, comprising:

obtaining a cross-sectional image of the multi-core fiber with a camera;

from the cross-sectional image, approximating, by a computer processor, a clad of the multi-core fiber with a circle;

from the cross-sectional image, measuring, by the computer processor, center coordinates of each of the cores in the clad with center coordinate of the circle as an origin; and judging, by the computer processor, that a desired connection is obtained, when a length $R_i$ of each line segment connecting the origin and the center coordinate of the core (i is a number of the core and is a natural number equal to or less than N) satisfies a range of $r_s - r_d \leq R_i \leq r_s + r_d$; and an angle $\theta_{i\text{-}j}$ formed by line segments of the adjacent cores (j is the number of the core adjacent to the core of number i, and is a natural number equal to or less than N) satisfies a range of $\theta_s - \theta_d \leq \theta_{i\text{-}j} \leq \theta_s + \theta_d$;

where

[Math. 1]
$$\theta s[deg] = \frac{360}{N}, \tag{1}$$

[Math. 2]
$$r_s = \frac{\Lambda}{2\cos\left(90 - \frac{\theta s}{2}\right)}, \tag{2}$$

[Math. 3]
$$\eta = \left\{\frac{2W_1 W_2}{W_1^2 + W_2^2}\right\}^2 \exp\left[-\frac{2d^2}{W_1^2 + W_2^2}\right], \tag{3}$$

[Math. 4]
$$r_d = \sqrt{-\frac{w_i^2 + w_j^2}{2}\ln\left[\frac{\eta}{\left\{\frac{2w_i w_j}{w_i^2 + w_j^2}\right\}^2}\right]}, \tag{4}$$

[Math. 5]
$$\theta_d = 2 * \tan^{-1}\left(\frac{r_d}{r_s}\right), \tag{5}$$

d is an axial deviation amount with the multi-core fiber of a connection partner; and $W_i$ is a mode field diameter (MFD) of the core of number i at a desired wavelength.

2. An evaluation method of a multi-core fiber in which N-pieces of cores (N is an integer of 3 or more) are arranged in an N-angular shape at a distance $\Lambda$ in a cross section, comprising:

obtaining a cross-sectional image of the multi-core fiber with a camera;

from the cross-sectional image, approximating, by a computer processor, a clad of the multi-core fiber with a circle;

from the cross-sectional image, measuring, by the computer processor, center coordinates of each of the cores in the clad with center coordinate of the circle as an origin; and judging, by the computer processor, that a desired connection is obtained, when a deviation amount $\delta\Lambda_x$ between a design center coordinate which is a design center coordinate of the core calculated by Math. 6 and the measured center coordinate satisfies $\delta\Lambda_x \leq r_d$;

[Math. 6]
$$\delta\Lambda_x = \sqrt{2r_s\{r_s + r - (r_s + r)\cos\theta\} + r^2} \tag{6}$$

where, $r = R_i - r_s$, $\theta = \theta_{i\text{-}j} - \theta_s$ $R_i$ represents a length of each line segment connecting the origin and the center coordinate of the core (i is a number of the core, and is a natural number equal to or less than N), $\theta_{i\text{-}j}$ represents an angle formed by the line segments of the adjacent cores (j is the number of the core adjacent to the core of number i, and is a natural number equal to or less than N)

where

[Math. 1]
$$\theta s[deg] = \frac{360}{N}, \tag{1}$$

[Math. 2]
$$r_s = \frac{\Lambda}{2\cos\left(90 - \frac{\theta s}{2}\right)}, \tag{2}$$

[Math. 3]
$$\eta = \left\{\frac{2W_1 W_2}{W_1^2 + W_2^2}\right\}^2 \exp\left[-\frac{2d^2}{W_1^2 + W_2^2}\right], \tag{3}$$

[Math. 4]
$$r_d = \sqrt{-\frac{w_i^2 + w_j^2}{2}\ln\left[\frac{n}{\left\{\frac{2w_i w_j}{w_i^2 + w_j^2}\right\}^2}\right]}, \tag{4}$$

d is an axial deviation amount with the multi-core fiber of a connection partner; and $W_i$ is a mode field diameter (MFD) of the core of number i at a desired wavelength.

3. An evaluation device that evaluates whether or not the multi-core fiber has a desired connection loss characteristic, comprising:

a camera configured to perform a cross-sectional observation of the multi-core fiber; and a processor configured to perform the evaluation method of the multi-core fiber according to claim 1.

4. The evaluation method of claim 1 further comprises cutting the multi-core fiber and polishing an exposed surface of the multi-core fiber prior to obtaining the cross-sectional image.

* * * * *